United States Patent [19]
Endo et al.

[11] Patent Number: 5,635,552
[45] Date of Patent: Jun. 3, 1997

[54] METHOD FOR DISPERSING PIGMENT AND WATER-BASED PIGMENT DISPERSION

[75] Inventors: Atsushi Endo; Akimitsu Mochizuki; Tadashi Itabashi; Masami Kuwabara, all of Tokyo, Japan

[73] Assignee: Toyo Ink Manufacturing Co., Ltd., Tokyo, Japan

[21] Appl. No.: 547,332

[22] Filed: Oct. 24, 1995

[30] Foreign Application Priority Data

Oct. 28, 1994 [JP] Japan ................................ 6-264920

[51] Int. Cl.$^6$ ........................ C08K 5/16; C08K 5/3467
[52] U.S. Cl. ........................ 524/100; 260/DIG. 38; 106/31.28; 106/31.77; 524/88; 524/190; 524/556
[58] Field of Search ........................ 524/100, 88, 190, 524/556; 260/DIG. 38; 106/22 K, 23 K

[56] References Cited

U.S. PATENT DOCUMENTS 5,420,187   5/1995   Endo et al. ........................ 524/556

*Primary Examiner*—Paul R. Michl
*Assistant Examiner*—John J. Guarriello
*Attorney, Agent, or Firm*—Wenderoth, Lind & Ponack

[57] ABSTRACT

A method is disclosed for dispersing a pigment to obtain a pigment dispersion. The method involves dispersing 100 parts by weight of a pigment, 0.1 to 30 parts by weight of a specific pigment dispersing agent and 5 to 300 parts by weight of a water-based resin in 100 to 2,000 parts by weight of an aqueous medium having a water-soluble organic solvent concentration of 4 to 15% by weight. Pigments are obtained which are suitable for the production of water-based coating compositions or water-based inks excellent in fluidity, storage stability, gloss of a coating, sharpness and tinting strength.

6 Claims, No Drawings

METHOD FOR DISPERSING PIGMENT AND WATER-BASED PIGMENT DISPERSION

FIELD OF THE INVENTION

The present invention relates to a method for dispersing a pigment, which gives a pigment excellent in fluidity and storage stability and excellent in the gloss of a coating and tinting strength when used as or in a water-based coating composition or a water-based ink.

PRIOR ART OF THE INVENTION

In recent years, coating compositions and inks are increasingly converted to water-based ones with increasing requirements for the protection of natural resources, environmental protection and working safety.

Like oil-soluble coating compositions and oil-soluble inks, water-based coating compositions and inks are required to have fluidity, storage stability, gloss of a coating, sharpness, tinting strength, etc. Since, however, most pigments are greatly poor in suitability to water-based vehicles such as dispensability, no satisfactory product quality can be obtained when they are dispersed by any general dispersing method. It has been therefore studied to use various additives such as a pigment-dispersed resin for a water-based pigment, a surfactant and the like. For water-based coating compositions or inks, however, no product which satisfies the above suitability and has a quality that can be equivalent to that of existing oil-soluble coating compositions or inks has been achieved. Some dispersed resins for water-based coating compositions or inks show some improvement in the gloss of a coating, sharpness and tinting strength, while these dispersed resins have the following critical defects in practical use. That is, these resins are impaired in fluidity, they have an increased viscosity or form a gel with time and they have an adverse effect on the properties of a coating.

SUMMARY OF THE INVENTION

It is an object of the present invention to provide a method for dispersing a pigment, for obtaining pigments suitable for the production of water-based coating compositions or water-based inks excellent in fluidity, storage stability, gloss of a coating, sharpness and tinting strength.

According to the present invention, there is provided a method for dispersing a pigment, which comprises dispersing 100 parts by weight of a pigment, 0.1 to 30 parts by weight of a pigment dispersing agent of the following formula (1) and 5 to 300 parts by weight of a water-based resin in 100 to 2,000 parts by weight of an aqueous medium having a water-soluble organic solvent concentration of 4 to 15% by weight,

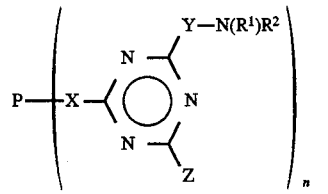

wherein P is an organic dyestuff residue or a heterocyclic ring residue, X is a direct bond or a divalent binding group consisting of a chemically rational combination of 1 to 50 atoms selected from S, C, N, O and H, Y is a direct bond, $-N(R^4)-R^3$ or $-O-R^3-$, in which $R^3$ is an optionally substituted alkylene group having 1 to 10 carbon atoms or an optionally substituted phenylene group and $R^4$ is H, an alkyl group having 1 to 18 carbon atoms or $-R^3-N(R^1)R^2$, Z is a hydroxyl group, an alkoxy group having 1 to 4 carbon atoms or $-Y-N(R^1)R^2$, each of $R^1$ and $R^2$ is independently an optionally substituted alkyl group having 1 to 18 carbon atoms or is a heterocyclic ring which may contain N, O or S, together with other ring atoms, and n is an integer of 1 to 3.

According to the present invention, there is also provided a pigment water-based dispersion obtained by the above method for dispersing a pigment.

According to the present invention, there is further provided a water-based coating composition or water-based ink comprising 100 parts by weight of a pigment and 100 to 700 parts by weight of a water-based resin, prepared from the above pigment water-based dispersion.

DETAILED DESCRIPTION OF THE INVENTION

The pigment used in the present invention includes a phthalocyanine pigment, an insoluble azo pigment, an azo-lake pigment, an anthraquinone pigment, a quinacridone pigment, a dioxazine pigment, a diketopyrrolopyrrole pigment, an anthrapyrimidine pigment, an anthanthrone pigment, an indanthrone pigment, a flavanthrone pigment, a perinone pigment, a perylene pigment, an isoindolinone pigment, a thioindigo pigment, carbonblack, iron oxide, white lead, red lead, ultramarine, prussian blue, cobalt oxide, titanium oxide, titanium dioxide, titanium dioxide-coated mica, strontium chromate, titanium yellow, titanium black, zinc chromate, iron black, molybdenum red, molybdenum white, lithopone, emerald green, cadmium yellow, cadmium red and cobalt blue.

In the formula (1) for the pigment dispersing agent, P is an organic dyestuff residue or a heterocyclic ring residue, X is a direct bond or a divalent binding group consisting of a chemically rational combination of 1 to 50 atoms selected from S, C, N, O and H, Y is a direct bond, $-N(R^4)-R^3$ or $-O-R^3-$, in which $R^3$ is an optionally substituted alkylene group having 1 to 10 carbon atoms or an optionally substituted phenylene group and $R^4$ is H, an alkyl group having 1 to 18 carbon atoms or $-R^3-N(R^1)R^2$, Z is a hydroxyl group, an alkoxy group having 1 to 4 carbon atoms or $-Y-N(R^1)R^2$, each of $R^1$ and $R^2$ is independently an optionally substituted alkyl group having 1 to 18 carbon atoms or is a heterocyclic ring which may contain N, O or S, together with other ring atoms, and n is an integer of 1 to 3.

The organic dyestuff residue used in the present invention includes those from phthalocyanine-containing, insoluble azo-containing, azo-lake-containing, anthrquinone-containing, anthrapyrimidine-containing, anthanthrone-containing, indanthron-containing, flavanthrone-containing, perinone-containing, perylene-containing and thioindigo-containing pigment dispersing agents. The pigment dispersing agent may be selected as required, while it is industrially advantageous to select a pigment dispersing agent having a hue similar to a pigment used.

The heterocyclic ring compound of the formula (1) includes thiophene, furan, xanthene, pyrrole, imidazole, isoindoline, isoindolinone, benzoimidazolone, quinoline, carbazole, acridine, acridone and anthraquinone. When P is a heterocyclic ring compound, the pigment dispersing agent of the formula (1) is almost free from being colored and is therefore advantageous for use for any pigment.

X is a direct bond or a divalent binding group consisting of a chemically rational combination of 1 to 50 atoms selected from S, C, N, O and H. More specifically, X is a binding group of a chemically rational combination of —O—, —NH—, —SO$_2$—, —CO—, —CH$_2$—, —COO—, and an optionally substituted alkylene group having 1 to 10 carbon atoms or an optionally substituted phenylene group.

For example, the binding group preferably includes —O—, —NH—, and —X$^1$—X$^2$—R$^5$—X$^3$—, in which X$^1$ is a direct bond, —SO$_2$—, —CO—, —CH$_2$— or —CH$_2$NHCOCH$_2$—, each of X$^2$ and X$^3$ is independently —O— or —NH—, and R$^5$ is an optionally substituted alkylene group having 1 to 10 carbon atoms or an optionally substituted phenylene group, since these pigment dispersing agents can be easily synthesized and therefore are industrially advantageous. The above optionally substituted phenylene group includes methyl-substituted phenylene, dimethyl-substituted phenylene and ethyl-substituted phenylene groups.

When each of R$^1$ and R$^2$ is an alkyl group, each is an alkyl group having 1 to 18 carbon atoms, preferably 1 to 6 carbon atoms, more preferably 1 to 4 carbon atoms, such as methyl, ethyl, propyl or butyl. The alkyl group may be branched or may be substituted so long as the number of carbon atoms does not exceed 18. Further, a combination of R$^1$ and R$^2$ may be a five-membered or six-membered heterocyclic ring which further contains N, O or S.

The pigment dispersing agent of the formula (1), used in the present invention is prepared, for example, by a method in which cyanuric chloride is reacted with a functional group of the organic dyestuff or heterocyclic ring compound or a functional group optionally introduced into the organic dyestuff or heterocyclic ring compound, and further, the reaction product is reacted with an amine component or alcohol component having the structure of —Y—N(R$^1$)R$^2$ in the formula (1). The above method may be also carried out by reacting cyanuric chloride with the above amine component or alcohol component and then reacting the reaction product with a functional group of the organic dyestuff or heterocyclic ring compound or with a functional group optionally introduced into the organic dyestuff or heterocyclic ring compound. The functional group of the organic dyestuff or heterocyclic ring compound, or the functional group optionally introduced into the organic dyestuff or heterocyclic rein, is any group which reacts with cyanuric chloride, and the functional group preferably includes amino and hydroxyl. The amine component or alcohol component having the structure of —Y—N(R$^1$)R$^2$ is selected, for example, from amines or alcohols of N,N-dimethylaminomethyl, N,N-dimethylaminoethyl, N,N-dimethylaminopropyl, N,N-dimethylaminoamyl, N,N-dimethylaminobutyl, N,N-diethylaminoethyl, N,N-diethylaminopropyl, N,N-diethylaminohexyl, N,N-diethylaminoethoxypropyl, N,N-diethylaminobutyl, N,N-diethylaminopentyl, N,N-dipropylaminobutyl, N,N-dibutylaminopropyl, N,N-dibutylaminoethyl, N,N-dibutylaminobutyl, N,N-diisobutylaminopentyl, N,N-methyl-laurylaminopropyl, N,N-ethyl-hexylaminoethyl, N,N-distearylaminoethyl, N,N-dioleylaminoethyl and N,N-distearylaminobutyl, or N-aminoethylpiperidine, N-aminoethyl-4-pipecoline, N-aminoethylmorpholine, N-aminopropylpiperidine, N-aminopropyl-2-pipecoline, N-aminopropyl-4-pipecoline, N-aminopropylmorpholine, N-aminomethylpiperidine, N-hydroxymethylpiperidine, N-hydroxyethylpiperidine, N-hydroxypropylpiperidine, N-hydroxyethylpipecoline, N-hydroxypropylpipecoline, N-hydroxymethylpyrrolidine, N-hydroxyethylmorpholine and N-hydroxybutylmorpholine.

The pigment dispersing agent can be also prepared by another method in which cyanuric chloride is introduced into the organic dyestuff or heterocyclic ring compound through a spacer, and then reacted with the amine component or alcohol component having the structure of —Y—N(R$^1$)R$^2$ in the formula (1) to obtain the pigment dispersing agent of the formula (1). This method may be carried out by reacting cyanuric chloride with the above amine component or alcohol component and then chemically bonding the resultant compound to the organic dyestuff or heterocyclic ring compound through a spacer. This method will be explained more in detail below. A substituent such as —SO$_2$Cl, —COCl, —CH$_2$Cl— or —CH$_2$NHCOCHCl$_2$ is introduced into the organic dyestuff or heterocyclic ring compound, and then the functional group is reacted with one functional group of a spacer. The spacer can be a compound which has two functional groups and works to combine the functional group introduced into the organic dyestuff or heterocyclic ring compound and cyanuric chloride. The spacer includes, for example, alkylenediamine, phenylenediamine, alkylene glycol, aminoalcohol and aminophenol. The spacer may have a protective group introduced for one of the two functional groups. The one amino group of the phenylenediamine or aminophenol may be a nitro group, and it can be reduced as required and used as an amino group for the reaction. Then, the other functional group of the spacer is reacted with cyanuric chloride, and the resultant compound is reacted with the amine component or alcohol component having the structure of —Y—N(R$^1$)R$^2$, to obtain the pigment dispersing agent of the formula (1).

The above reaction is carried out in an organic solvent, water or a mixture of these, and it may be carried out in the presence of a catalyst selected from agents for removing hydrochloric acid, such as pyridine, triethylamine, sodium hydroxide or sodium carbonate. When an alcohol, water or a mixture of these is used as a solvent, one of the chlorine atoms of the cyanuric chloride undergoes hydrolysis during the reaction to form a hydroxyl or alkoxyl group in some cases. In such case the performance of the dispersing agent is not at all affected.

According to the above preparation method, the pigment dispersing agent may be synthesized from an organic dyestuff or a heterocyclic ring compound which is synthesized from a compound obtained by introducing cyanuric chloride and a structure of —Y—N(R$^1$)R$^2$ into a raw material for the synthesis of the organic dyestuff or the heterocyclic ring compound.

The pigment dispersing agent used in the present invention may be used in a powder state when the pigment is dispersed, or may be mixed with the pigment in advance. When a solution or dispersion of the pigment dispersing agent in a solvent or a mineral acid aqueous solution is used, it can be added to a slurry of the pigment in water or a solvent so that the pigment dispersing agent is adsorbed on the pigment surface. When the pigment is an azo pigment, the above solution or dispersion can be added when the azo pigment is produced by coupling. When the pigment is a phthalocyanine pigment, a quinacridone pigment or a dioxazine pigment, a powder, solution or dispersion of the pigment dispersing agent may be added when the pigment is formed by a salt milling method or a sulfuric acid dissolving method so that and the pigment dispersing agent may be adsorbed on the pigment surface, the mixture is filtered and the remainder is dried. Any one of the above-obtained pigment compositions may be used in the present invention.

In the present invention, the amount of the pigment dispersing agent per 100 parts by weight of the pigment is 0.1 to 30 parts by weight. When this amount is less than 0.1 part by weight, no effect is obtained. When it is greater than 30 parts by weight, no further effect can be obtained.

The water-based resin used in the present invention includes water-dispersible or water-soluble acrylic copolymer, styrene-acrylate copolymer, styrene-maleate copolymer, alkyd, epoxy, polyester and urethane resins, while a water-dispersible or water-soluble acrylic copolymer resin is particularly preferred.

The acrylic copolymer resin is a resin having a weight average molecular weight of 5,000 to 300,000 and an acid value of 1 to 200, obtained by emulsion-polymerizing 50 to 80% by weight of (meth)acrylic acid alkyl ester, 5 to 30% by weight of a carboxylic acid-containing monomer such as acrylic acid, methacrylic acid, maleic acid or itaconic acid and 0 to 20% by weight of other monomer or by solution-polymerizing them in a water-soluble solvent. The above (meth)acrylic acid alkyl ester includes methyl (meth)acrylate, ethyl (meth)acrylate, propyl (meth)acrylate, n-butyl (meth)acrylate, isopropyl (meth)acrylate, isobutyl (meth)acrylate, 2-ethylhexyl (meth)acrylate, n-hexyl (meth)acrylate and lauryl (meth)acrylate. The above "other monomer" includes 2-hydroxyethyl (meth)acrylate, 2-hydroxypropyl (meth)acrylate, acrylamide, N-methylolacrylamide, diacetoneacrylamide, glycidyl (meth)acrylate, styrene, vinyltoluene, vinyl acetate, acrylonitrile, vinyl alcohol and ethylene.

The above water-dispersible resin can be obtained by dropwise adding a mixture of the above monomers to an aqueous medium containing an emulsifier, and emulsion-polymerizing the monomers. A dispersing agent having a high molecular weight may be used in place of, or in combination with, the emulsifier. The water-dispersible resin in the present invention may be dispersed in a water-based dispersion after a carboxylic acid which is combined with the resin is neutralized by adding an amine or ammonia. For example, an acrylic copolymer resin having a free carboxylic acid, synthesized in a hydrophilic organic solvent, is neutralized with an organic amine, and water is added, whereby a water-dispersible resin is obtained.

The above water-dispersible resin can be obtained by neutralizing the acrylic copolymer resin having a free carboxylic acid, obtained by polymerization in a hydrophilic organic solvent, with an organic amine and adding water.

The water-soluble organic solvent contained in the aqueous medium in the present invention can be selected from all of organic solvents which are miscible with water. Preferred are glycol organic solvents such as mono- or dialkyl ethers of ethylene glycol, diethylene glycol and propylene glycol. More preferred is a monoalkyl ether of ethylene glycol, diethylene glycol or propylene glycol.

In the method for dispersing a pigment, provided by the present invention, the concentration of the water-soluble organic solvent in the aqueous medium is 4 to 15% by weight. When this concentration is less than 4% by weight, the solubility of the pigment dispersing agent in the presence of the water-based resin is insufficient, and the adsorption of the pigment dispersing agent to the pigment surface is insufficient, so that no effect of the present invention is obtained. When it is higher than 15% by weight, the solubility of the water-based resin is excessively high, and the adsorption of the resin to the pigment surface or to the pigment surface to which the pigment dispersing agent is adsorbed is insufficient, so that no effect of the present invention is obtained.

The method for dispersing a pigment in the present invention may be carried out as follows. That is, 0.1 to 30 parts by weight of the pigment dispersing agent of the formula (1) is mixed with 100 parts by weight of the pigment in 100 to 2,000 parts by weight of the aqueous medium having a water-soluble organic solvent concentration of 10 to 25% by weight (pretreatment step), and then, 5 to 300 parts by weight of the water-based resin and water or the water-soluble organic solvent are added to the mixture to obtain a dispersion having a water-soluble organic solvent concentration of 4 to 15% by weight based on the total amount of aqueous media.

When the water-soluble organic solvent concentration in the pretreatment step is lower than 10% by weight, the solubility of the pigment dispersing agent is insufficient, and the adsorption of the pigment dispersing agent on the pigment surface is therefore insufficient, so that no effect of the present invention is obtained. When the above concentration is higher than 25% by weight, the viscosity of the mixture is too high to form a homogeneous dispersion.

The amount of the water-based resin as a solid content per 100 parts by weight of the pigment is 5 to 300 parts by weight. When this amount is less than 5 parts by weight, the pigment is not completely dispersed. When it exceeds 300 parts by weight, it is disadvantageous in terms of tinting strength.

The pigment or the pigment composition is preferably dispersed in the dispersion or solution of the water-based resin with a dispersing apparatus such as a dissolver, a high-speed mixer, a homomixer, a sand mill or an atritor.

The dispersion obtained by the method for dispersing a pigment in the present invention can be used as any one of a water-based coating composition, a water-based ink and concentrated dispersions of these. When the above dispersion is used as a water-based coating composition or ink, the amount of the water-based resin as a solid content per 100 parts by weight of the pigment is preferably 100 to 700 parts by weight. When it is used as a concentrated dispersion, the amount of the water-based resin as a solid content per 100 parts by weight of the pigment is preferably 5 to 300 parts by weight. Further, when the concentrated dispersion is prepared into a coating composition or an ink, it is preferred to add a water-based resin or a curing agent such as melamine so that the total amount of the water-based resin as a solid content may be 100 to 700 parts by weight.

EXAMPLES

The present invention will be explained more in detail hereinafter with reference to Examples, in which "part" stands for "part by weight".

Preparation Example 1

9 Parts of 4,4'-diamino-1,1'-dianthraquinone and 37 parts of cyanuric chloride were added to 10 parts of dioxane, and the mixture was stirred at 90°–100° C. for 10 hours. Then, the reaction mixture was cooled and filtered, and the remainder was dried to give 14 parts of a red powder. 10 Parts of the so-obtained powder was dissolved in 100 parts of dioxane, 12 parts of N,N-dimethylaminopropylamine was added, and the mixture was stirred at 90°–100° C. for 3 hours. The reaction mixture was cooled and poured into ice water, 10 parts of sodium carbonate was added, and the mixture was filtered. The remainder was washed with water and dried to give 15 parts of a pigment dispersing agent (a).

Preparation Example 2

12 Parts of a pigment dispersing agent (b) was obtained in the same manner as in Example 1 except that 12 parts of N,N-dimethylaminopropylamine was replaced with 10 parts of N,N-diethylaminoethanol.

Preparation Example 3

8 Parts of a pigment dispersing agent (c) was obtained in the same manner as in Example 1 except that 12 parts of N,N-dimethylaminopropylamine was replaced with 10 parts of diethylamine.

Preparation Example 4

6 Parts of copper phthalocyanine having an average of 3 methylol groups per molecule was dispersed in 50 parts of dimethylformamide, and 6 parts of cyanuric chloride was added. The mixture was stirred at 140°–150° C. for 3 hours, and the reaction mixture was cooled and filtered. The remainder was dried to give 10 parts of a blue powder. 7 Parts of the so-obtained powder was dispersed in 100 parts of dioxane, and 18 parts of N-aminopropylmorpholine and 8 parts of pyridine were added. The mixture was stirred at 110°–120° C. for 10 hours. The reaction mixture was cooled and filtered, and the remainder was dried to give 3 parts of a pigment dispersing agent (d).

Preparation Example 5

5 Parts of copper phthalocyanine having an average of 1 chloromethyl group per molecule was dispersed in 100 parts of water, and 1 part of ethylene glycol was added. The mixture was stirred at 10°–20° C. for 2 hours and filtered, and the remainder was washed with water and again dispersed in 100 parts of water. Then, 15 parts of cyanuric chloride was added, and the mixture was stirred at 10°–20° C. for 2 hours. Further, 33 parts of N-butylaminopropylamine was added, and the mixture was stirred at 50°–60° C. for 2 hours. The reaction mixture was filtered, and the remainder was washed with water and dried to give 9 parts of a pigment dispersing agent (e).

Preparation Example 6

5 Parts of copper phthalocyanine sulfonyl chloride was dispersed in 100 parts of water, and 2 parts of p-phenylenediamine was added. The mixture was stirred at 80°–90° C. for 2 hours, and the reaction mixture was filtered. The remainder was washed with water, and the again dispersed in 100 parts of water. Then, 15 parts of cyanuric chloride was added, and the mixture was stirred at 30°–40° C. for 2 hours. Further 33 parts of N-dibutylaminopropylamine was added, and the mixture was stirred at 50°–60° C. for 2 hours, and filtered. The remainder was washed with water and dried to give 10 parts of a pigment dispersing agent (f).

Preparation Example 7

5 Parts of chloroacetoaminomethyl copper phthalocyanine was dispersed in 100 parts of water, and 2 parts of p-phenylenediamine was added. The mixture was stirred at 80°–90° C. for 2 hours, and filtered. The remainder was washed with water and then again dispersed in 100 parts of water. Then, 15 parts of cyanuric chloride was added, and the mixture was stirred at 30°–40° C. for 2 hours. Further, 33 parts of N,N-dibutylaminopropylamine was added, and the mixture was stirred at 50°–60° C. for 2 hours, and filtered. The remainder was washed with water and dried to give 9 parts of pigment dispersing agent (g).

Preparation Example 8

19 Parts of cyanuric chloride, 15 parts of p-aminoacetanilide and 11 parts of sodium carbonate were added to a mixed solvent containing 200 parts of acetone and 100 parts of water, and the mixture was stirred at 30°–40° C. for 1 hour. Then, 30 parts of N,N-dipropylaminoethylamine was added, and the mixture was stirred at 50°–60° C. for 3 hours. The reaction solvent was distilled off under reduced pressure, 300 parts of 1% hydrochloric acid was added, and the mixture was stirred at 90°–100° C. for 1 hour. Then, the reaction mixture was cooled, and sodium hydroxide was added to adjust the mixture to a pH of 9–10. The resultant precipitate was recovered by filtration, washed with water and dried to give 40 parts of a brownish solid. 22 Parts of the so-obtained solid 7as dissolved in 500 parts of 5% hydrochloric acid, and the mixture was cooled to 5° C. or lower. Then, 6 parts of sodium nitrite was added, and the mixture was stirred at 5° C. or lower for 1 hour to obtain a diazo component.

12 Parts of 5-acetoacetoaminobenzimidazolone was dissolved in 1,000 parts of a 4% sodium hydroxide aqueous solution, and 100 parts of sodium carbonate was added to form a solution. The above diazo component was gradually added to the solution, and the mixture was stirred for 1 hour and then filtered. The remainder was washed with water and dried to give 32 parts of a pigment dispersing agent (h).

Preparation Example 9

19 Parts of cyanuric chloride, 15 parts of p-aminoacetanilide and 11 parts of sodium carbonate were added to a mixed solvent containing 200 parts of acetone and 100 parts of water, and the mixture was stirred at 30°–40° C. for 1 hour. Then, 22 parts of N,N-dibutylaminopropylamine was added, and the mixture was stirred at 50°–60° C. for 3 hours. The reaction solvent was distilled off under reduced pressure, 300 parts of 1% hydrochloric acid was added, and the mixture was stirred at 90°–100° C. for 1 hour. Then, the reaction mixture was cooled, and sodium hydroxide was added to adjust the reaction mixture to a pH of 9–10. The resultant precipitate was recovered by filtration, washed with water, and dried to give 30 parts of a brownish solid. Then, 10 parts of the so-obtained solid was dissolved in 100 parts of 50% acetic acid, 5 parts of anthraquinone-2-carbonyl chloride was added, and the mixture was stirred at 40°–50° C. for 2 hours. The reaction mixture was filtered, and the remainder was washed with water and dried to give 14 parts of a pigment dispersing agent (i).

Preparation Examples 10–15

Pigment dispersing agents (j) to (o) shown in Table 1 were obtained in the same manner as in Preparation Examples 1 to 9.

TABLE 1

| Prep. Ex. | Pigment dispersing agent | Organic dyestuff or heterocyclic ring | Formula of Substituent | Number of substituents |
|---|---|---|---|---|
| 1 | a | C.I. Pigment Red 178 | (A) | 2 |
| 2 | b | C.I. Pigment Red 178 | (B) | 2 |
| 3 | c | C.I. Pigment Red 178 | (C) | 2 |
| 4 | d | C.I. Pigment Blue 15 | (D) | 3 |
| 5 | e | C.I. Pigment Blue 15 | (E) | 1 |
| 6 | f | C.I. Pigment Blue 15 | (F) | 1 |
| 7 | g | C.I. Pigment Blue 15 | (G) | 1 |
| 8 | h | C.I. Pigment Yellow 108 | (H) | 1 |
| 9 | i | Anthraquinone | (I) | 1 |
| 10 | j | C.I. Pigment Violet 19 | (J) | 2 |
| 11 | k | C.I. Pigment Violet 23 | (K) | 1 |

TABLE 1-continued

| Prep. Ex. | Pigment dispersing agent | Organic dyestuff or heterocyclic ring | Formula of Substituent | Number of substituents |
|---|---|---|---|---|
| 12 | l | C.I. Pigment Red 2 | (L) | 1 |
| 13 | m | C.I. Pigment Red 178 | (M) | 1 |
| 14 | n | Acridone | (N) | 1 |
| 15 | o | Carbazole | (O) | 1 |

Note:
Prep. Ex. = Preparation Example

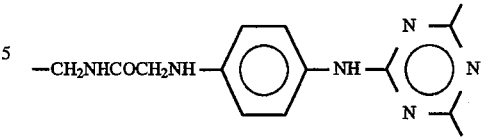

Chemical formula (A)

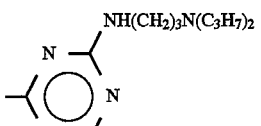

Chemical formula (B)

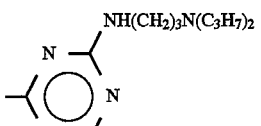

Chemical formula (C)

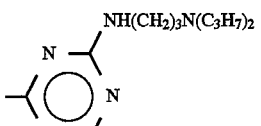

Chemical formula (D)

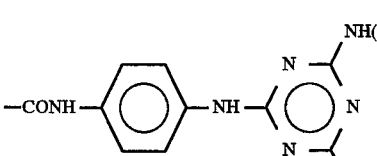

Chemical formula (E)

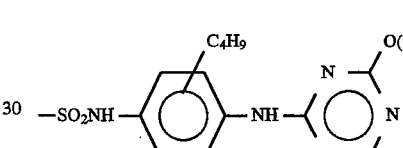

Chemical formula (F)

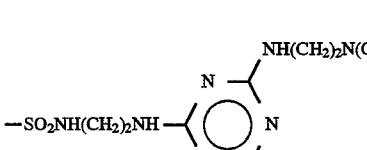

Chemical formula (G)

wherein A is $-NH(CH_2)_3N(C_4H_{10})$.

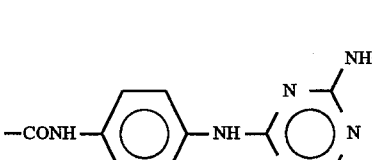

Chemical formula (H)

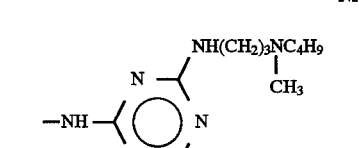

Chemical formula (I)

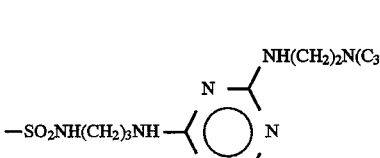

Chemical formula (J)

Chemical formula (K)

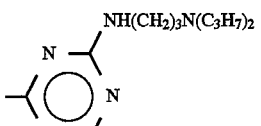

Chemical formula (L)

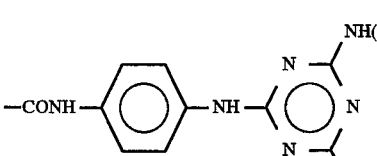

Chemical formula (M)

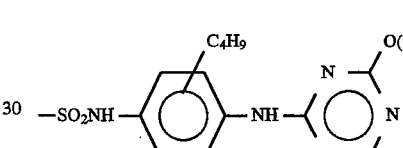

Chemical formula (N)

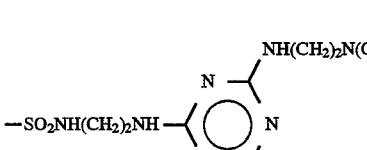

-continued

Chemical formula (O)

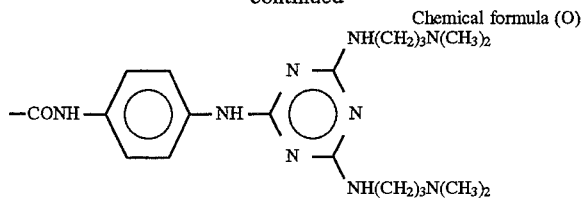

Example 1

A glass container having a volume of 225 ml was charged with 9.9 parts of C.I. Pigment Red 177, 0.1 part of the pigment dispersing agent (a), 12.5 parts of a solution (solid content 20% by weight, butyl carbitol 20% by weight, ion-exchanged water 60% by weight) of an acrylic resin having a number average molecular weight of 25,000 and an acid value of 60, 20 parts of ion-exchanged water and 150 parts of 3 mmØ alumina beads, so that the mixture had a water-soluble organic solvent concentration of 8.3% by weight. These materials were dispersed with a paint conditioner for 3 hours. 37.5 Parts of the same acrylic resin as that used above and 5 parts of a methylated melamine resin (trade name: Cymel 303, supplied by Mitsui-Cyanamid) were added to, and mixed with, the above-obtained dispersion to give a water-based coating composition. The so-obtained water-based coating composition was spread over a PET film with a 4-mil film applicator, and baked at 140° C. for 30 minutes to give a coating having excellent gloss. The coating was measured for a 20° gloss with a digital angle-variable gloss meter to show 72%.

Example 2

A glass container having a volume of 225 ml was charged with 9.9 parts of C.I. Pigment Red 177, 0.1 part of the pigment dispersing agent (a), 3 parts of butyl carbitol, a solution (solid content 20% by weight, butyl carbitol, 17 parts of ion-exchanged water and 150 parts of 3 mmØ alumina beads, so that the mixture had a water-soluble organic solvent concentration of 15% by weight. These materials were dispersed with a paint conditioner for 30 minutes. Then, 12.5 parts of the same acrylic resin as that used in Example 1 and 36 parts of ion-exchanged water were added to the above-obtained dispersion so that the mixture had a water-soluble organic solvent concentration of 8.3% by weight. Then, these materials were dispersed with a paint conditioner for 3 hours. 37.5 Parts of the same acrylic resin as that used above and 5 parts of the same methylated melamine resin as that used above were added to, and mixed with, the above-obtained dispersion to give a water-based coating composition. The so-obtained water-based coating composition was spread and baked in the same manner as in Example 1, and the resultant coating was measured for a 20° gloss in the same manner as in Example 1 to show 82%.

Examples 3–19

Coating compositions were obtained in the same manner as in Example 1 except that the pigment dispersing agent was replaced with the pigment dispersing agents (b) to (o), and the coating compositions were spread and baked in the same manner as in Example 1 to give coatings having excellent gloss. Table 2 shows the results.

Comparative Example 1

A coating composition was obtained in the same manner as in Example 1 except that the amount of ion-exchanged water was changed to 60 parts so that the water-soluble organic solvent concentration was 3.6% by weight. The so-obtained coating composition was spread and baked in the same manner as in Example 1, and the resultant coating was measured for a 20° gloss in the same manner as in Example 1 to show 51%.

Comparative Example 2

A coating composition was obtained in the same manner as in Example 1 except that 3 parts of butyl carbitol was added when a dispersion was formed so that the dispersion had a water-soluble organic solvent concentration of 16.7% by weight. The so-obtained coating composition was spread and baked in the same manner as in Example 1, and the resultant coating was measured for a 20° gloss in the same manner as in Example 1 to show 59%.

Comparative Examples 3–9

Coating compositions were prepared from the same pigments as those used in Examples 1 to 19 in the same manner as in Example 1 except that no pigment dispersing agent was added. The so-obtained coating compositions were spread and baked in the same manner as in Example 1, and each of the resultant coatings was measured for a 20° gloss in the same manner as in Example 1 to show poor gloss. Table 2 shows the results.

TABLE 2

| CEx. Ex. | Pigment | Pigment dispersing agent | Amount ratio *1 | 20° gloss |
|---|---|---|---|---|
| CEx. 1 | C.I. Pigment Red 177*2 | (a) | 9.9/0.1 | 51 |
| CEx. 2 | " | (a) | 9.9/0.1 | 59 |
| CEx. 3 | " | — | 10/0 | 43 |
| Ex. 1 | " | (a) | 9.9/0.1 | 72 |
| Ex. 2 | " | (a) | 9.9/0.1 | 82 |
| Ex. 3 | " | (a) | 9.9/0.1 | 84 |
| Ex. 4 | " | (a) | 9/1 | 86 |
| Ex. 5 | " | (b) | 9.5/0.5 | 84 |
| Ex. 6 | " | (c) | 9.5/0.5 | 82 |
| CEx. 4 | C.I. Pigment Blue 15:1*3 | — | 10/0 | 39 |
| Ex. 7 | " | (d) | 9/1 | 80 |
| Ex. 8 | " | (e) | 9/1 | 78 |
| Ex. 9 | " | (f) | 9/1 | 80 |
| Ex. 10 | " | (g) | 9/1 | 77 |
| CEx. 5 | C.I. Pigment Red 179*4 | — | 10/0 | 48 |
| Ex. 11 | " | (h) | 9.5/0.5 | 80 |
| Ex. 12 | " | (i) | 8/2 | 83 |
| Ex. 13 | " | (m) | 9.5/0.5 | 85 |
| CEx. 6 | C.I. Pigment Violet 19*5 | — | 10/0 | 35 |
| Ex. 14 | " | (j) | 9.5/0.5 | 67 |
| Ex. 15 | " | (n) | 9.5/0.5 | 63 |
| CEx. 7 | C.I. Pigment Violet 23*6 | — | 10/0 | 33 |
| Ex. 16 | " | (k) | 9/1 | 71 |
| Ex. 17 | " | (o) | 9/1 | 74 |
| CEx. 8 | C.I. Pigment Red 170*7 | — | 10/0 | 31 |
| Ex. 18 | " | (l) | 9.5/0.5 | 65 |
| CEx. 9 | C.I. Pigment Black 11*8 | — | 10/0 | 30 |
| Ex. 19 | " | (e) | 8/2 | 71 |

Ex. = Example, CEx. = Comparative Example,
*1 Pigment/pigment dispersing agent,
*2 Anthraquinone pigment
*3 Phthalocyanine pigment,
*4 Perylene pigment,
*5 Quinacridone pigment,
*6 Dioxazine pigment
*7 Naphthol pigment,
*8 Carbon black In the present invention, the pigment dispersing agent of the formula (1) for a pigment is co-dispersed in an aqueous medium having the specific water-soluble organic solvent concentration together with a water-based resin, so that there can be obtained a water-based pigment dispersion for a water-based coating composition and a water-based ink which are excellent in fluidity, storage stability, gloss of a coating and tinting strength.

What is claimed is:

1. A pigment dispersion containing
   (a) 100 parts by weight of a pigment,
   (b) 0.1 to 30 parts by weight of a pigment dispersing agent of the formula

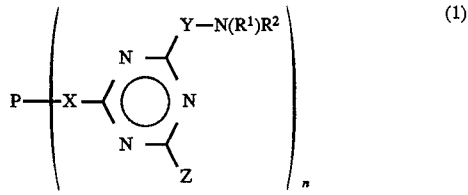

wherein P is an organic dyestuff residue or a heterocyclic ring residue, X is a direct bond, —N— or —$X^1$—$X^2$—$R^5$—$X^3$— in which $X^1$ is a direct bond, —$SO_2$—, —CO—, —$CH_2$— or —$CH_2NHCOCH_2$—, each of $X^2$ and $X^3$ is independently —O— or —NH— and $R^5$ is an alkylene group having 1 to 10 carbon atoms, a phenylene group, a methyl-substituted phenylene group, a dimethyl-substituted phenylene group or an ethyl-substituted phenylene group, Y is a direct bond, —N($R_4$)—$R^3$ or —O—$R^3$— in which $R^3$ is an alkylene group having 1 to 10 carbon atoms or a phenylene group, $R^4$ is H, an alkyl group having 1 to 18 carbon atoms or —$R^3$—N($R^1$)$R^2$, Z is a hydroxyl group, an alkoxy group having 1 to 4 carbon atoms or —Y—N($R^1$)$R^2$, each of $R^1$ and $R^2$ is independently an alkyl group having 1 to 18 carbon atoms, or $R^1$ and $R^2$ together with the nitrogen to which they are attached form a heterocyclic ring which may additionally contain N, O or S, and n is an integer of 1 to 3, and (c) 5 to 300 parts by weight of a water-based resin, dispersed in 100 to 2,000 parts by weight of an aqueous medium the dispersion having a water-soluble organic solvent concentration of 4 to 15% by weight based on the total amount of aqueous media.

2. A pigment dispersion according to claim 1 wherein each of $R^1$ and $R^2$ is an alkyl group having 1 to 6 carbon atoms.

3. A pigment dispersion according to claim 1 wherein $R^1$ and $R^1$, together with the nitrogen to which they are attached form a five-membered or six-membered heterocyclic ring which may additionally contain at least one member selected from the group consisting of N, O and S.

4. A method for dispersing a pigment which comprises
   mixing 100 parts by weight of a pigment and 0.1 to 30 parts by weight of a pigment dispersing agent of the formula

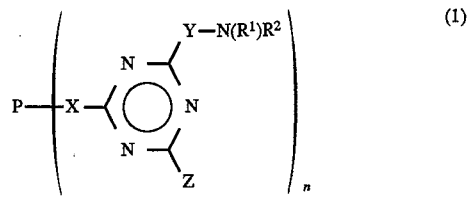

wherein P is an organic dyestuff residue or a heterocyclic ring residue, X is a direct bond, —N— or —$X^1$—$X^2$—$R^5$—$X^3$— in which $X^1$ is a direct bond, —$SO_2$—, —CO—, —$CH_2$— or —$CH_2NHCOCH_2$—, each of $X^2$ and $X^3$ is independently —O— or —NH— and $R^5$ is an alkylene group having 1 to 10 carbon atoms, a phenylene group, a methyl-substituted phenylene group, a dimethyl-substituted phenylene group or an ethyl-substituted phenylene group, Y is a direct bond, —N($R^4$)—$R^3$ or —O—$R^3$— in which $R^3$ is an alkylene group having 1 to 10 carbon atoms or a phenylene group, $R^4$ is H, an alkyl group having 1 to 18 carbon atoms or —$R^3$—N($R^1$)$R^2$, Z is a hydroxyl group, an alkoxy group having 1 to 4 carbon atoms or —Y—N($R^1$)$R^2$, each of $R^1$ and $R^2$ is independently an alkyl group having 1 to 18 carbon atoms, or $R^1$ and $R^2$ together with the nitrogen to which they are attached form a heterocyclic ring which may additionally contain N, O or S, and n is an integer of 1 to 3, in 100 to 2,000 parts by weight of an aqueous medium having a water-soluble organic solvent concentration of 10 to 25% by weight, and adding to the resultant mixture 5 to 300 parts by weight of a water-based resin and water or a water-soluble organic solvent to form a dispersion having a water-soluble organic solvent concentration of 4 to 15% by weight based on the total amount of aqueous media.

5. A pigment water-based dispersion obtained in accordance with the method of claim 4.

6. A water-based coating composition or water-based ink containing the pigment dispersion as defined in claim 1, wherein the pigment dispersion contains 100 to 700 parts by weight of the water-based resin per 100 parts by weight of the pigment.

* * * * *

UNITED STATES PATENT AND TRADEMARK OFFICE
CERTIFICATE OF CORRECTION

PATENT NO. : 5,635,552
DATED : June 3, 1997
INVENTOR(S) : ATSUSHI ENDO, AKIMITSU MOCHIZUKI, TADASHI ITABASHI, MASAMI KUWABARA It is certified that error appears in the above-identified patent and that said Letters Patent is hereby corrected as shown below:

Column 13, in claim 1, line 2 after the formula, change "-N-" to -- -NH- --;

line 10, after the formula, change "-N(R$^4$)-R$^3$" to read -- -N(R$^4$)-R$^3$ --.

Column 13, in claim 3, line 2, "R$^1$" should read --R$^2$.

Column 14, in claim 4, line 2 after the formula, change "-N-" to read --NH--.

Signed and Sealed this

Seventeenth Day of March, 1998

Attest:

BRUCE LEHMAN

Attesting Officer       Commissioner of Patents and Trademarks